June 14, 1966 W. F. RIDENOUR 3,255,940
TORSIONAL IMPACT SEVERING MACHINE
Filed Aug. 17, 1964 4 Sheets-Sheet 1
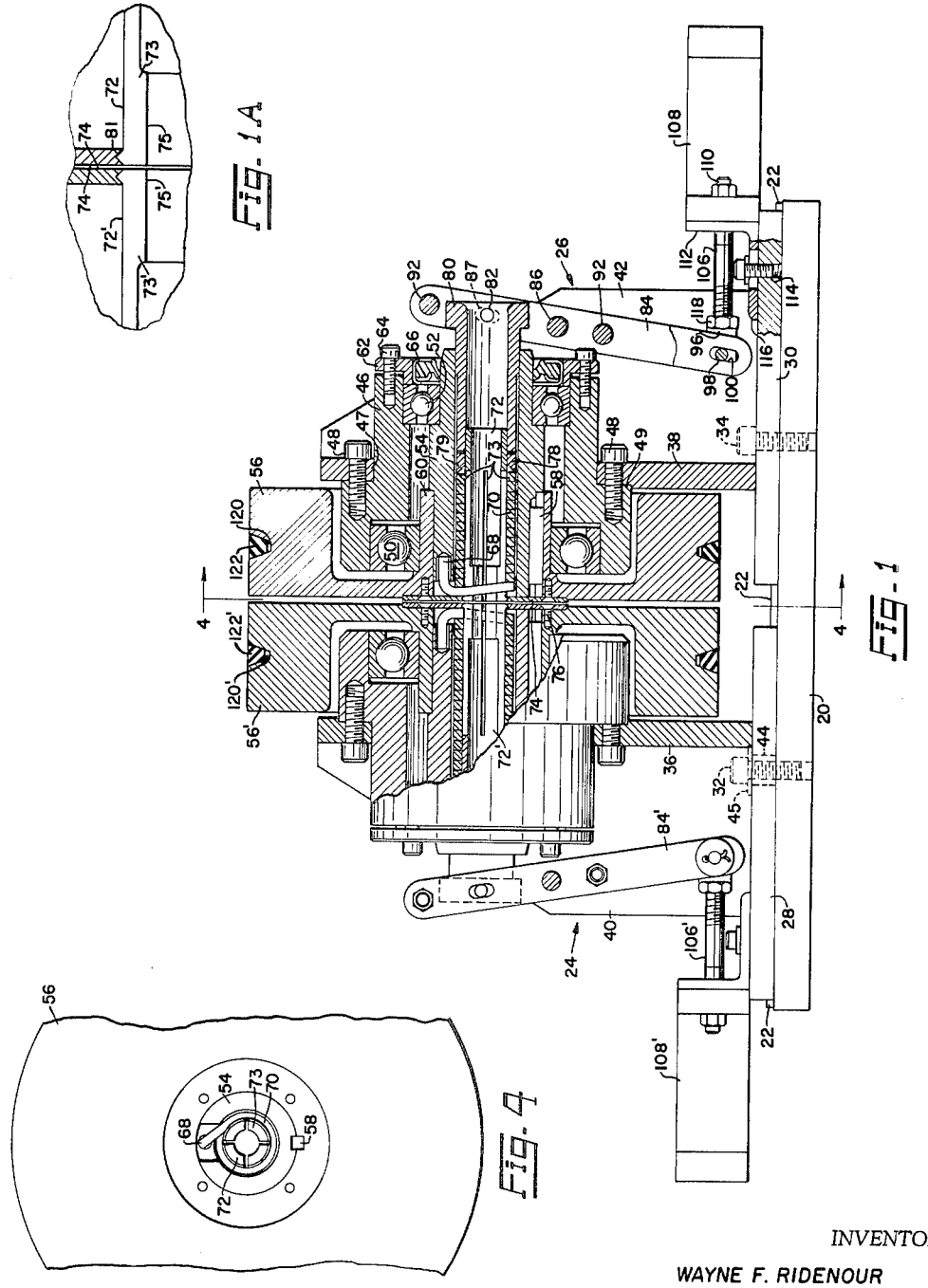
INVENTOR
WAYNE F. RIDENOUR
BY Strauch, Nolan & Neale
ATTORNEYS

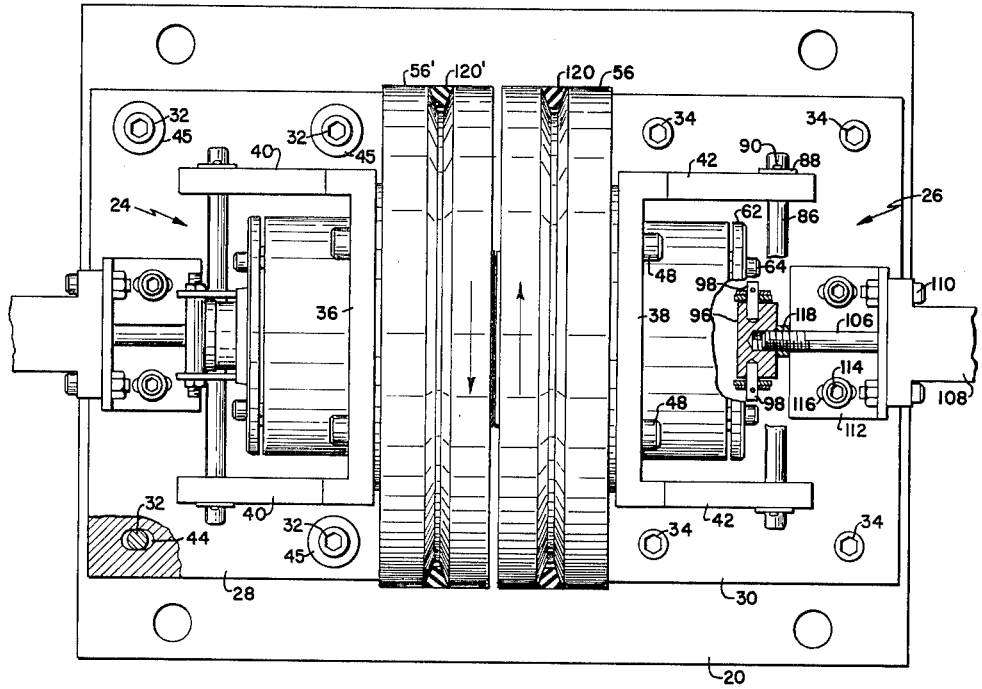
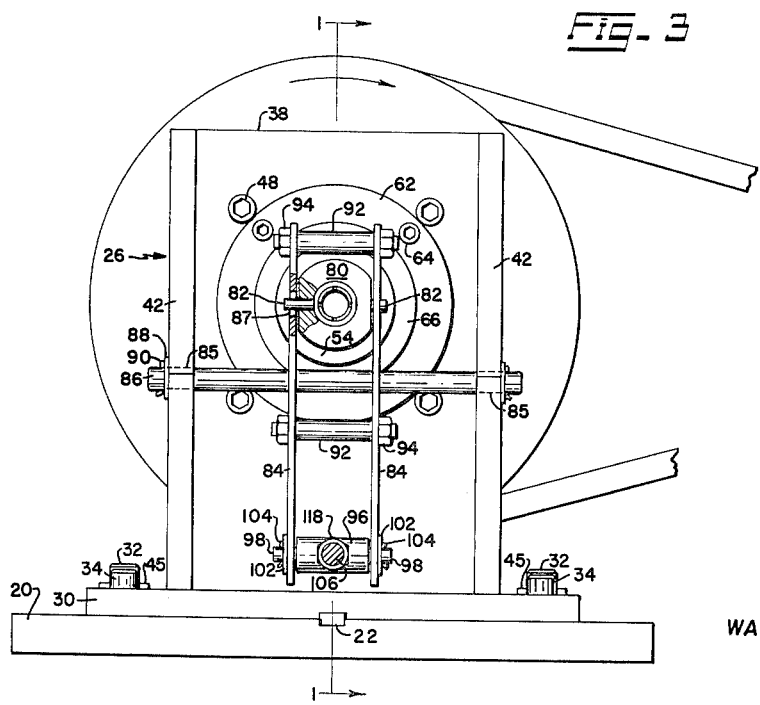
Fig. 3
Fig. 2
INVENTOR
WAYNE F. RIDENOUR
BY Strauch, Nolan & Neale
ATTORNEYS June 14, 1966  W. F. RIDENOUR  3,255,940
TORSIONAL IMPACT SEVERING MACHINE
Filed Aug. 17, 1964  4 Sheets-Sheet 3
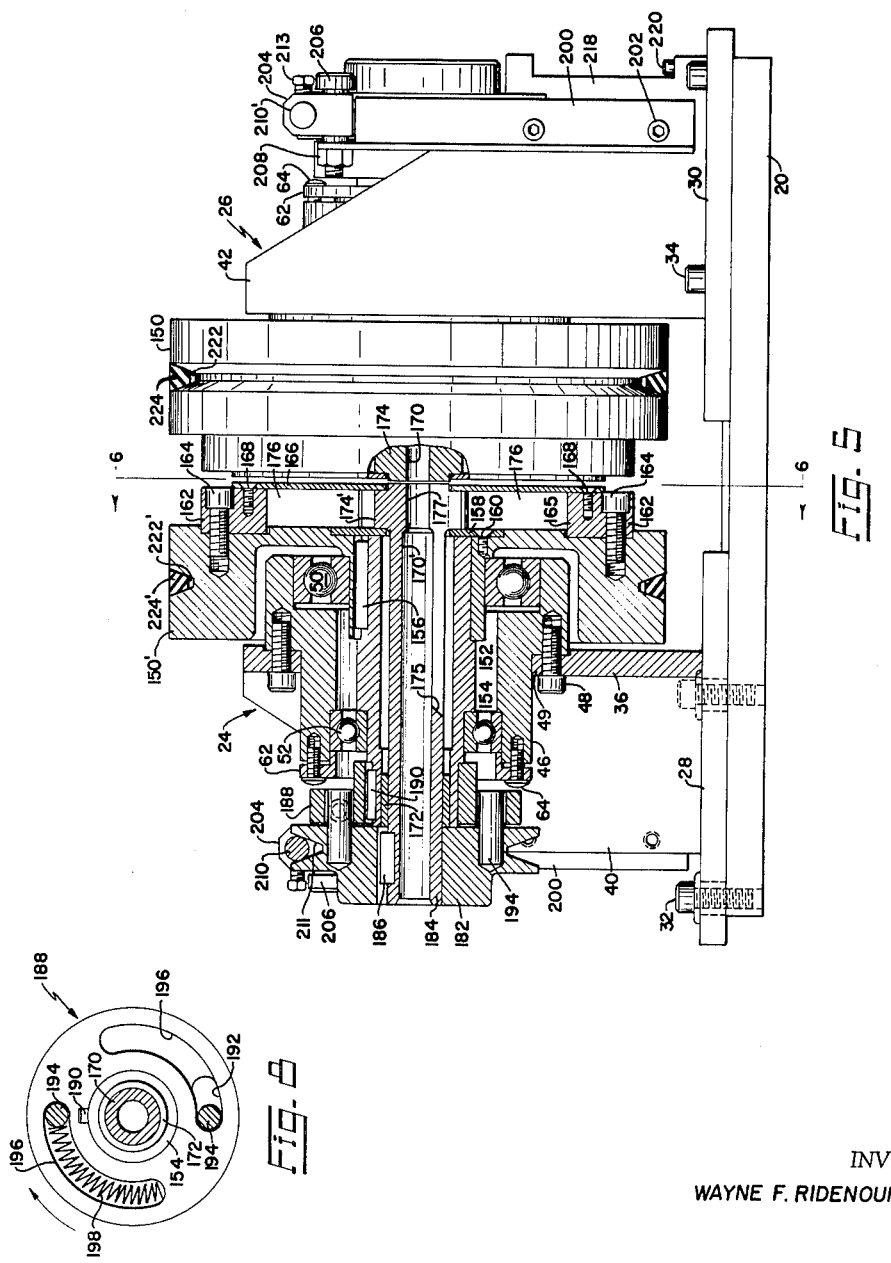
INVENTOR
WAYNE F. RIDENOUR
BY  *Strauch, Nolan & Neale*
ATTORNEYS June 14, 1966 W. F. RIDENOUR 3,255,940
TORSIONAL IMPACT SEVERING MACHINE
Filed Aug. 17, 1964 4 Sheets-Sheet 4
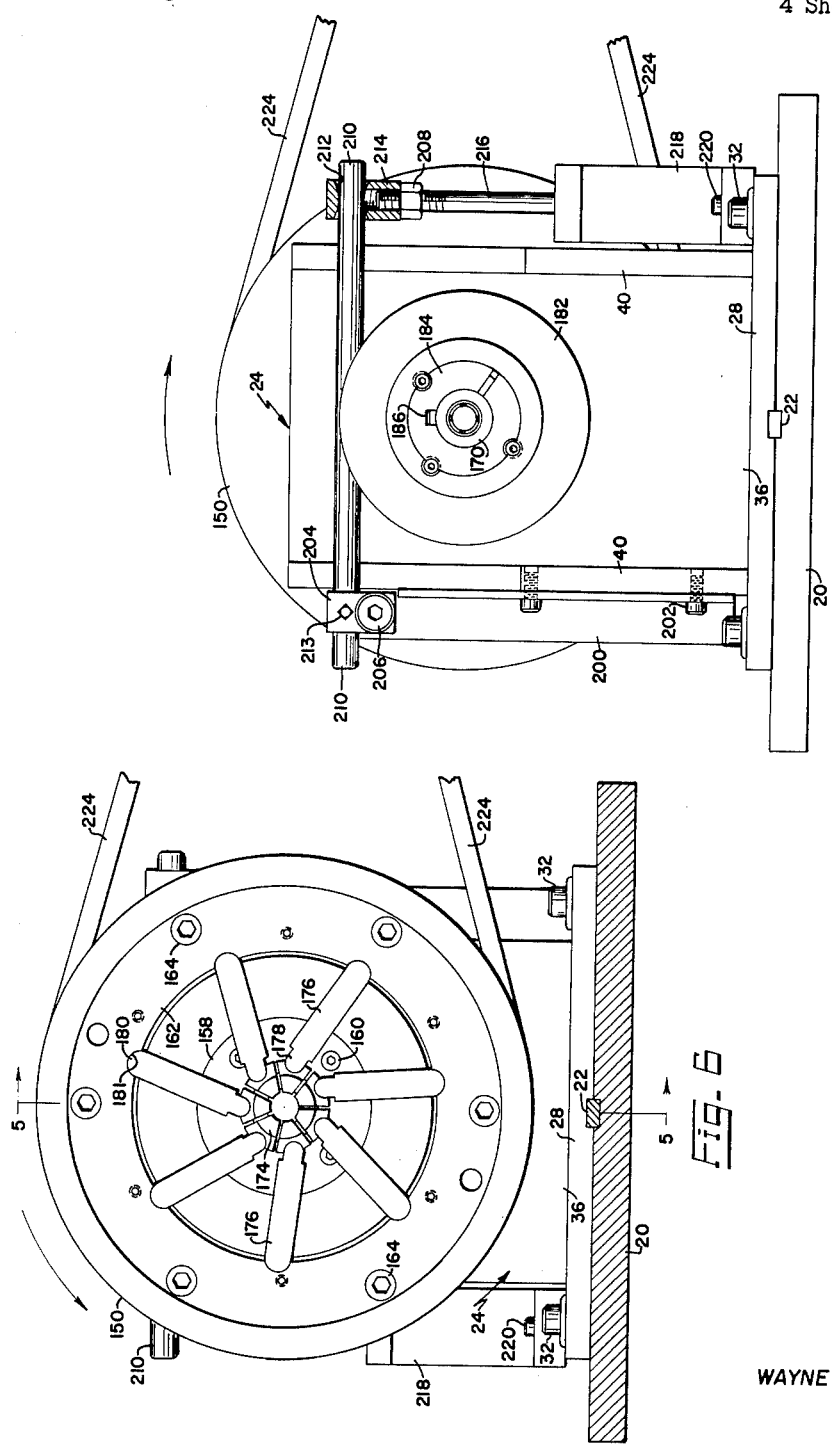
INVENTOR
WAYNE F. RIDENOUR
BY *Strauch, Nolan & Neale*
ATTORNEYS United States Patent Office 3,255,940
Patented June 14, 1966

3,255,940
TORSIONAL IMPACT SEVERING MACHINE
Wayne F. Ridenour, Chicago, Ill., assignor, by mesne assignments, to Landis Machine Company, Waynesboro, Pa., a corporation of Pennsylvania
Filed Aug. 17, 1964, Ser. No. 390,126
15 Claims. (Cl. 225—102)

This invention relates to machines for parting or severing solid cylindrical or tubular metallic stock, wire or the like, and particularly to machines in which the stock is severed by the application of a torsional force.

Presently, when relatively short lengths of solid bar stock are required for subsequent manufacturing operations, the stock is passed between a pair of intermittently operated shearing dies which cut a short length from the bar by relative movement of one or both dies transversely to the axis of the bar. This operation invariably deforms the end of the cut-off piece to a degree that renders it unsuitable for further precise machining operations. For example, if a secondary threading operation is to be performed, a deformed workpiece end such as produced by the conventional shearing operation results in defective threads and excessive chaser breakage. In most cases the deformation cannot be entirely corrected by a turning operation subsequent to the shearing operation, and if it can be corrected the cost of and the time consumed by such turning operations are usually prohibitive. For cutting tubular stock conventional pipe cutters are used, with rotating knives, to prevent inward deformation, but this is also a slow operation.

The process of applying a torsional force to separate a short length of stock from a bar or coil of wire has been employed to avoid the lateral or transverse deformation mentioned above. In the past such processes involve the gradual application of a torsional force to one end of the stock while the other end is held stationary or to both ends of the stock in opposite directions. This method is not in general use because it is very slow, it results in another type of end deformation and is practically impossible to apply to cylindrical stock, which constitutes the large majority of the field of use.

So-called torsional shearing is also employed in testing machines for measuring the torsional strength of a test specimen. In such machines an abrupt, impact-type of torsional force is applied to the part to be sheared, which part must be machined to a special shape and is of definite length. Such an operation is useless for the purposes herein considered for several reasons. Parts of indefinite length such as bar stock cannot be handled, nor can material of uniform cross-section, since the ends of the test specimens must be provided with driving means. The operation including insertion and removal of the workpieces, is prohibitively time-consuming. Most important is the fact that the result is an angular fracture, producing an end that is completely objectionable on machined parts.

The above disadvantages are effectively obviated by this invention. By employing stored kinetic energy to apply an impact torsional force to the stock being operated upon and by subjecting a minimal length of the stock to this force, the invention produces a clean fracture, exactly perpendicular to the axis of the stock and without any of the types of deformation referred to above. The machine of the invention includes means for gripping the stock and simultaneously applying the severing force. The actual severing operation is performed practically instantaneously so the volume of production of cut-off parts is dependent solely on the velocity of axial feed of the stock. Fast operation of the machine is further enhanced by virtue of the fact that bars, wire or tubing of indeterminate length can be passed continuously through the machine and intermittently gripped and severed at any desired interval.

It is an object of the invention to provide a method of severing metallic bar stock, wire, tubing or the like at high production rates to produce a clean, square end on a workpiece.

A further object of the invention is to implement the above method by subjecting the stock, in substantially a single transverse plane, to a kinetic torsional force sufficient to fracture the stock substantially instantaneously.

Another object is to provide a machine for carrying out the above method, employing axially-fixed counter-rotating energy-storing devices to store the torsional momentum prior to its application to the stock.

It is a further object to provide, in a machine as described above, means for intermittently connecting the energy-storing devices to the stock to transmit a torsional impact force thereto at any desired interval of time.

A still further object of the invention is to provide a machine as described above, capable of operating upon indeterminate lengths of stock of uniform circular cross-section, and wherein the means for connecting the energy-storing devices to the stock is actuated by the operation of fluid motors.

Other objects and advantages of the present invention will be apparent from the following description with reference to the accompanying drawings, wherein:

FIGURE 1 is a side elevation of an embodiment of a torsional severing machine, partly in section along line 1—1 of FIGURE 2;

FIGURE 1A is a sectional view in enlarged detail of a portion of FIGURE 1;

FIGURE 2 is an end elevation of the machine of FIGURE 1;

FIGURE 3 is a top plan view of the machine, partly in section along line 3—3 of FIGURE 2;

FIGURE 4 is a fragmentary view of the machine, taken substantially along line 4—4 of FIGURE 1, but with plate 74 removed, to more clearly expose the torsion spring and the collet;

FIGURE 5 is a side elevation of a second embodiment of a torsional severing machine, partly in section along line 5—5 of FIGURE 6;

FIGURE 6 is a vertical sectional view, taken along line 6—6 of FIGURE 5;

FIGURE 7 is an end elevation of the machine as viewed from the right of FIGURE 5; and FIGURE 8 is a sectional view taken along line 8—8 of FIGURE 5.

With reference to FIGURES 1 through 4, which collectively illustrate a first embodiment of the machine of the invention, a base plate 20 is provided with a longitudinal key 22 for aligning duplicate brackets, indicated generally at 24 and 26. The brackets 24 and 26 comprise bases 28 and 30, respectively, secured to the base plate 20 by means of screws 32 and 34 respectively, and upright plates 36 and 38 respectively, which have mutually opposed surfaces in vertical planes, facing the center of the machine. Brackets 24 and 26 also comprise side plates 40 and 42 which may be welded to the bases 28 and 30 and to plates 36 and 38 to form rigid, unitary structures for supporting the operating members of the machine. Elongated slots 44 (FIGURE 3) are provided in base 28, surrounding each of the screws 32 to allow bracket 24 and to be adjusted in a direction toward and from bracket 26, and in view of the slots, washers 45 are used under the heads of the screws 32.

In general, the machine comprises two identical halves, symmetrical about the line 4—4 of FIGURE 1. Consequently, only the right hand half will be described in detail, it being understood that the same description applies to the left hand half.

An outer sleeve member 46, having a horizontal axis perpendicular to the upright plate 38 is disposed in a circular bore 47 in that plate and secured to the plate by means of screws 48, an external shoulder 49 being provided on the outer sleeve member 46 to define its axial position with respect to the bracket 26. The outer sleeve 46 serves to support an anti-friction bearing 50 in its centrally facing end and a second anti-friction bearing 52 in its outward end. Journalled in bearings 50 and 52 in a rotatable assembly comprising an inner sleeve member 54 and a flywheel 56 connected for unitary rotation with the inner sleeve member 54 by means of a key 58. The hub 60 of the flywheel 56 surrounds the centrally facing end of sleeve 54 and is journalled directly in the bearing 50. A retaining cap 62, secured to the outward end of sleeve 46 by means of screws 64, holds the bearing 52 in correct axial position. A seal 66 is pressed into the bore in the cap 62 and closely surrounds the rotatable sleeve 54 to retain lubricant in the apparatus.

An axially directed hole 68 (FIGURE 1) is formed in the centrally facing end of sleeve 54 to receive one end of a tightly wound torsion spring 70, made of wire of rectangular cross-section, the bulk of which is disposed within the sleeve 54. The spring 70 closely surrounds a spring collet 72 having four radial slots 73 as is apparent from FIGURE 4, and the spring 70 and collet 72 are retained within the sleeve 54 by means of a plate 74 secured to the central face of the flywheel 56 by screws 76.

A friction washer 78, mounted on the collet 72 makes contact with the end of spring 70 remote from the machine center. The left face 79 of the friction washer 78 is conical, as shown in FIGURE 1, and the right end of the torsion spring 70 is partially conical, to mate with the conical left face 79 of the friction washer 78. The same end of collet 72, is received for free rotation in an axial bore in a bushing 80, journalled for axial sliding movement only in the rotatable sleeve 54 and extending outwardly beyond the end of that sleeve. The left end of the collet has an external flange 81 which is conical in cross-section as seen in FIGURE 1, and FIGURE 1A, and is received in a mating conical groove in the central opening of plate 74 to prevent axial movement of the collet in either direction. The flutes of the collet are sufficiently flexible and the slots 73 are sufficiently wide to permit springing the flange 81 inwardly sufficiently to be inserted through the central opening of plate 74.

Near the outward end of bushing 80, a pair of pins 82 are fixedly imbedded therein and project radially therefrom (FIGURE 2) into suitable slotted openings 87 in a pair of levers 84 fulcrumed on a rod 86 which is supported in aligned openings 85 (FIGURE 2) in the side plates 42 and retained in position by means of washers 88 and cotter pins 90. The two levers 84 are maintained at the correct spacing from each other by a pair of studs 92 fitted with nuts 94. A block 96 (FIGURES 2 and 3) is pivotally mounted between the levers 84 near the lower ends thereof on a pair of pins 98 imbedded in the block 96. The pins 98 project through elongated slots 100 in the levers 84 and washers 102 and cotter pins 104 are applied externally of the levers 84 to complete the assembly.

The piston rod 106 of a fluid cylinder 108 is threadedly engaged in the block 96 so that the levers 84 are rocked about the fulcrum 86 upon power actuation of the cylinder 108. The cylinder 108 is attached by bolts 110 to the upright portion of a right-angle bracket 112 whose base portion is secured by screws 114 to the bracket base 30. The screws 114 pass through elongated slots 116 in the bracket 112 to provide for longitudinal adjustment of the cylinder 108. A nut 118 is provided on the piston rod 106 to lock it in axial position relative to the block 96.

The two flywheels of the machine, 56, described above and 56', its counterpart on the left side of the machine are provided on their circumferences with grooves 120 and 120', respectively, to accommodate V-belts 122 and 122' for driving the flywheels rotatively. The belts 122 may be connected to separate electric motors (not shown) for driving the flywheels in opposite directions as indicated by the arrows thereon in FIGURE 3. The retaining plates 74 and collet 72 on the right hand side of the machine are separated by perhaps ten thousandths of an inch from their counterpart elements on the left side of the machine, so as to provide a small clearance for these counter-rotating parts, but as will be explained later, this separation need not be this small, and may be larger.

In the operation of the above-described embodiment, the flywheels 56 and 56' are set in motion, driven at high speeds but in opposite directions from separate electric motors (not shown) via the V-belts 122 and 122'. Flywheel speeds of from 500 to 750 r.p.m. have been found suitable but is obvious that higher or lower speeds may be used. The retaining plate 74 rotates with the flywheel 56 by virtue of being secured thereto by the screw 76. The sleeve 54 also rotates with the flywheel 56 due to the presence of the key 58. The spring 70, collet 72 and friction washer 78 also rotate with the flywheel 56. The bushing 80 is held against rotation by the pins 82. Exactly similar operation takes place on the left side of the machine (FIGURE 1).

The stock to be severed is introduced axially into the bores of collet 72 and its left-side counterpart 72', and fed into the machine until the point at which the fracture is to be made lies exactly in the plane dividing the two halves of the machine, i.e. within the small clearance separating the faces of collets 72 and 72'. Any suitable gaging means, not shown, may be used for so locating the stock. This is the plane in which the stock will be severed. This may be done with the flywheels rotating at full speed. Now, by any convenient automatic or manual means, pressure is applied in the fluid cylinders 108 and its left-side counterpart 108' to quickly force the piston rods 106 and 106' thereof axially and simultaneously away from the center of the machine.

As related to the right hand side of the machine, this motion of the piston rod 106 rocks the levers 84 in the counter-clockwise direction about the fulcrum 86, forcing the bushing 80 toward the center of the machine by means of the pins 82. The centrally facing conical end of the bushing 80 presses the friction washer 78 against the adjacent end of the torsion spring 70. This action has the effect of stopping the rotation of the outward end of the spring 70 while the inward end continues to rotate, being held in the axial hole 68. Consequently, when this torsional force is put upon the spring 70, its diameter tends to decrease and it tightens upon the collect 72, seizing the stock and transmitting to it the momentum of the flywheel 56.

Since the identical sequence of events is simultaneously taking place on the other side of the machine, but with the flywheel 56' rotating in the opposite direction, a severe torsional impact load is imposed on the stock which consequently breaks cleaning in the plane 4—4 without deforming the fractured ends. The break takes place virtually instantaneously, permitting the pressure in the cylinders 108 and 108' to be released immediately so that the stock may continue to be fed in the original axial direction into position for another severing operation.

As stated above the faces of collets 72 and 72' are preferably separated only by sufficient space to permit their counter-rotation without interference with each other. The collets may in some cases be separated further than absolutely necessary for counter-rotation without adverse effect upon the quality of the severed ends, but the maximum spacing is variable, dependent upon the stock material and speed of rotation of the flywheels and can be determined by experimentation. In any case the closer the spacing between the opposing faces of the collets 72 and 72' the more clearly defined is the point on the axial length of the stock or work piece at which the torsional breaking shear and break occurs.

As best shown in FIGURE 1A the collets 72 and

72' each have a reduced inner diameter 75 and 75' for a short axial distance away from where they face each other, so that the gripping of the bar stock or work piece 77 shown by dot dash lines in FIGURE 1 is adjacent the line 4—4 of FIGURES 1 and 1A where the shear occurs.

A second embodiment of the severing machine of this invention is illustrated in FIGURES 5 through 8. Various parts of the structure of this second embodiment are identical to those of the first embodiment and such parts are identified in FIGURES 5 through 8 by the same reference numerals used in the description above for the identical parts in FIGURES 1 through 4. As before, this embodiment comprises two identical halves, symmetrical about the line 6—6 of FIGURE 5. Consequently, only the left-hand half, shown in section in FIGURE 5, will be described in detail, it being understood that the same description applied to the right-hand half.

A flywheel 150' has a hub 152 journalled for rotation with the inner race of the larger anti-friction bearing 50. An inner sleeve 154 is fitted within the hub 152 and is journalled for rotation with the inner race of outer anti-friction bearing 52. A key 156 joins the flywheel 150' and inner sleeve 154 for unitary rotation. A plate 158, secured to the centrally directed face of flywheel 150' by screws 160, prevents relative movement between the flywheel and inner sleeve 154 in one axial direction. A ring member 162 is secured by screws 164 to the centrally facing surface of flywheel 150' and the relatively large central bore 165 in ring 162 is covered by a face plate 166, affixed to ring 162 by screws 168.

A stock-receiving spring collet 170' is journalled in a plain bearing 172 disposed in the outward end of the inner sleeve 154. Collet 170, in the exemplary embodiment shown, has seven gripping segments 174' (FIGURE 6) located in the space between plates 158 and 166, which plates define the axial location of the collet 170. The gripping segments 174' terminate at their left ends in FIGURE 5 at 175, and at their right ends as viewed in FIGURE 5 have a reduced diameter indicated by 177 to grip the stock or work piece, indicated by dot dash lines at 179, in the region adjacent the section line 6—6. A plurality of sprags 176 (FIGURE 6), one for each segment, are also disposed in the space between plate 158 and face plate 166. As seen in FIGURE 6, where the plate 166 is removed, each sprag 176 has a rounded groove in one of the gripping segments 174' of collet 170'. The similarly rounded outer end 180 of each sprag 176 is received in a corresponding longitudinal groove 181 in the bore of the ring 162.

On the outer end of the collet 170' is mounted a V-belt pulley 182 by means of a conventional tapered bushing 184 for maintaining the axial position of the pulley 182. A key 186 is provided to drive the collet 170' from the pulley 182. Inwardly of the pulley 182 an annular member 188 is mounted on the outward extremity of the inner sleeve 154 and is driven therewith by means of a key 190. The member 188 is provided with arcuate slots 192 (FIGURE 8) into which project pins 194 imbedded in axially directed holes in the pulley 182. Elongated arcuate recesses 196 form extensions of slots 192 on the outer face of the annular member 188 and receive compression springs 198, one end of each spring 198 abutting a pin 194 while the other end rests in the end of the recess 196. Only one of the springs 198 is shown in FIGURE 8, in order to better show a slot 192.

As shown in FIGURE 7, a bracket 200 formed of a length of angle iron is attached to one of the side plates 40 of the bracket 24 by means of screws 202 and extends vertically to a level slightly above the top of the pulley 182. A connector member 204 is secured to the top of the bracket 200 by means of a bolt 206 and nut 208 (FIGURE 5). The connector member 204 has a second hole, perpendicular to that occupied by the bolt 206, to receive one end of a brake rod 210. The brake rod 210 extends transversely of the machine in close proximity to the sides of the V-shaped groove 211 on the periphery of the pulley 182. On the opposite side of the pulley (FIGURE 7) the rod 210 is engaged in an opening 212 in a connector member 214. A screw 213 clamps the brake rod 210 in the connector member 204. The substantially vertical piston rod 216 of a fluid cylinder 218 is threadedly engaged in the lower end of the connector member 214. The cylinder 218 is seated on the base 28 and is attached thereto by screws 220.

As in the first embodiment, the two flywheels of this embodiment, 150' described above and 150, its counterpart on the right hand side of the machine, are provided on their circumferences with grooves 222' and 222 to accommodate V-belts 224' and 224 which may be connected to separate electric motors, for example, for driving the flywheels at high speed, but in opposite directions. The above remarks with reference to the axial spacing between collets 72 and 72' apply here also with reference to collets 170 and 170'.

In the operation of this second embodiment, the flywheels 150 and 150' are set in motion, driven in opposite directions at substantially the same speeds from separate electric motors (not shown) via the belts 224 and 224'. The ring member 162, plates 158 and 166 and the sprags 176 rotate with the flywheel 150'. The inner sleeve 154 and the member 188, being keyed together and to the flywheel 150, also rotate therewith. The annular member 188 drives the pulley 182 through the springs 198 and pins 194. The pulley 182 in turn drives the spring collet 170' through the key 186. Identical operation takes place on the right-hand side of the machine, except that flywheel 150 and the parts connected thereto rotate in the opposite direction, as in the embodiment of FIGURES 1 to 4.

The stock to be severed is introduced axially into the bores of collets 170 and its left side counterpart 170' and is fed into the machine until the point at which the fracture is to be made lies exactly in the plane dividing the two halves of the machine, i.e. within the small clearance separating the faces of collet segments 174 and 174' or along the line 6—6 of FIGURE 5. Now, by any convenient automatic or manual means, pressure is applied in the air cylinders 218 and its left side counterpart to quickly force the piston rods 216 and 216' (not shown) thereof to exert a simultaneous downward pull on the ends of brake rods 210 and 210' on the left and right hand ends of the machine respectively.

As related to the left side of the machine, a downward pull on the end of rod 210 as viewed in FIGURE 6 causes it to rock slightly about the axis of the bolt 206 and to come into frictional contact with the sides of the V-shaped groove 211 in the circumference of pulley 182. The resultant friction decelerates the pulley 182 and the pins 194 consequently move in the slots 192 to compress the springs 198 in the arcuate recesses 196. At the same time the deceleration of pulley 182 is transmitted to the collet 170' and its gripping segments 174'. Accordingly, the inner ends 178 of sprags 176 are slowed relative to the outer ends 180 thereof and the angular position of each sprag 176 more nearly approaches the radial position. This action forces the collet segments 174' abruptly and powerfully inwardly to seize the stock 179 and transmit to it the momentum of flywheel 150'. The arrangement here may be described as a sprag clutch.

Since the identical sequence of events is simultaneously taking place on the other or right hand side of the machine, but with the flywheel 150 rotating in the opposite direction, a severe torsional impact load is imposed on the stock 179 which consequently breaks cleanly in the plane 6—6 without deforming the fractured ends. The break takes place virtually instantaneously. Thus the pressure in the fluid cylinders 218 at the opposite ends of the machine may be released practically immediately after its application, since the deceleration caused by the initial application of this pressure is sufficient to lock each collet upon the stock and break it so quickly as is obvious, this fluid pressure release may be by manual or automatic means.

It will be seen, thus, that the second embodiment of the machine operates basically in the same manner as the first. It has been found, however, that the sprag clutch mechanism of the second embodiment operates to seize the stock somewhat more positively and quickly than the torsion-spring mechanism of FIGURES 1 to 4 and hence results in less slippage of the stock in the collets in the extremely short interval of time occupied by the gripping action which results in the shearing and breaking of the stock or work piece.

As in the case of the embodiment of FIGURES 1 to 4 the axial spacing of the faces of the opposing collets is preferably such that they are so closely adjacent as to just permit their counter rotation without touching or otherwise interfering with each other, so as to clearly locate the point on the axial length of the stock where the torsional shear and break occurs.

While the invention has been described in connection with the severing of metallic solid cylindrical or tubular stock it is also applicable to similarly shaped stock of other materials that have physical characteristics permitting them to be sheared in the same manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A machine for severing bar stock, wire, tubing and the like in a plane perpendicular to its axis comprising:
   (a) a first means for storing rotary kinetic energy,
   (b) a second means for storing rotary kinetic energy, coaxial with said first means, but with its kinetic energy directed counter to said first means,
   (c) means for driving both said energy storing means so as to impart rotary kinetic energy to them,
   (d) and means for simultaneously and abruptly separately connecting each of said energy storing means to closely adjacent coaxial positions of a work piece, whereby torsional impact forces in opposite directions are imparted to the work piece at said closely adjacent coaxial positions to instantly sever the work piece between said positions.

2. A machine for severing bar stock, tubing, wire and the like comprising:
   (a) a supporting frame,
   (b) a pair of flywheels mounted for independent coaxial rotation in said frame,
   (c) means for driving said flywheels rotatively in opposite directions at high speed,
   (d) adjoining coaxial stock gripping means driven by said flywheels and mounted for rotation therewith but in opposite rotational directions with the flywheels by which they are driven,
   (e) said adjoining stock gripping means being sufficiently spaced so as to prevent interference with each other during their rotation in opposite directions,
   (f) and means for simultaneously and abruptly actuating each of said stock gripping means to grip the stock while said flywheels are rotating in opposite directions, whereby torsional impact forces in opposite directions sufficient to instantaneously shear the stock in a plane transverse to its axis and between said adjoining gripping means are imparted to the stock.

3. The machine of claim 2, wherein said stock gripping means are resilient and have coaxial openings therethrough to receive the stock.

4. The machine of claim 2, wherein said closely adjoining stock gripping means are in the form of coaxial collets with resilient radially inwardly deflectable portions for gripping the stock,
   (a) and said means for abruptly actuating said stock gripping means comprise means for simultaneously inwardly deflecting the said inwardly deflectable portions of said collets driven by each of said flywheels.

5. The machine of claim 2, wherein said adjoining stock gripping means are so closely spaced as to leave therebetween only a substantially transverse planar ungripped portion of the work piece.

6. The machine of claim 2, wherein said adjoining stock gripping means are mounted centrally of said flywheels for coaxial rotation therewith.

7. The machine of claim 2, wherein said stock gripping means are in the form of segments of a hollow cylinder to surround the stock and are mounted to be movable toward and away from their axis,
   (a) said means for actuating said stock gripping means including a pair of helical torsion springs, one surrounding each of said gripping means,
   (b) and said means for simultaneously and abruptly actuating each of said stock gripping means includes means for stopping the rotation of one end of each said torsion spring, whereby the diameter of each spring is reduced to clamp the segments forming said stock gripping means against the stock.

8. A torsional severing machine as defined in claim 2, wherein said stock gripping means are in the form of segments of a hollow cylinder to surround the stock and are mounted to be movable toward and away from their axis,
   (a) said means for actuating said stock gripping means including a sprag connection between said stock gripping means and its associated flywheel,
   (b) and brake means for actuating said sprag connection to exert a gripping force upon said stock gripping means.

9. A machine for severing a work piece in the form of bar stock, tubing, wire and the like by a torsional impact force in a plane perpendicular to the axis of the work piece comprising,
   (a) a first and second closely adjacent coaxial stock gripping means,
   (b) said first gripping means being rotatable with respect to said second gripping means about their common axis,
   (c) flywheel means rotatable to store rotary kinetic energy,
   (d) means for driving said flywheel means at high speed,
   (e) means connecting said first gripping means to said flywheel means to drivingly rotate said first gripping means at high speed,
   (f) means preventing said second gripping means from rotating in the same direction as said first gripping means,
   (g) said first and second closely adjacent stock gripping means being sufficiently spaced so as to prevent interference with each other during the relative rotation between said stock gripping means,
   (h) means for actuating said second stock gripping means to firmly clamp it to a work piece,
   (i) and means for abruptly clamping said first stock gripping means upon a work piece while rotating at high speed, whereby the work piece is instantly severed in a transverse plane between said closely adjacent first and second stock gripping means.

10. A torsional severing machine as described in claim 9, wherein said means connecting said first gripping means to said flywheel means drives said first gripping means at the same speed as said flywheel means.

11. A torsional severing machine as described in claim 9, wherein means are provided to adjust the spacing between said first and second coaxial stock gripping means.

12. A torsional severing machine as described in claim 9, wherein means are provided to simultaneously drivingly rotate said second gripping means for said flywheel means in a direction opposite to the direction of rotation of said first gripping means.

13. A torsional severing machine as described in claim 12, wherein said means for actuating said second stock gripping means to firmly clamp it to a work piece is operable abruptly at the same time as said means for abruptly clamping said first stock gripping means upon a work piece.

14. A torsional severing machine as described in claim 13, wherein said flywheel means comprises first and second flywheels, the first drivingly rotating said first stock gripping means and the second drivingly rotating said second stock gripping means.

15. A torsional severing machine as described in claim 14, wherein said first stock gripping means is journalled on the same axis as said first flywheel and is mounted within said first flywheel and driven at the same speed thereby, (a) and said second stock gripping means is similarly journalled on the same axis as said second flywheel and is mounted within said second flywheel and driven at the same speed thereby.

References Cited by the Examiner
UNITED STATES PATENTS

| | | | |
|---|---|---|---|
| 358,884 | 3/1887 | Roberts | 225—102 X |
| 2,067,140 | 1/1937 | Dinzle | 73—99 |
| 2,633,742 | 4/1953 | Dietsch et al. | 73—99 |
| 2,712,756 | 7/1955 | Greer et al. | 73—99 |
| 3,156,394 | 11/1964 | Alles et al. | 225—102 X |

WILLIAM W. DYER, JR., *Primary Examiner.*

J. M. MEISTER, *Assistant Examiner.*